US007849192B2

(12) United States Patent
Brandstätter

(10) Patent No.: US 7,849,192 B2
(45) Date of Patent: Dec. 7, 2010

(54) USER-HOST-COMPUTER SYSTEM WITH AUTOMATIC ALLOCATION OF USER-SESSIONS TO VIRTUALIZED BLADE-TYPE-SERVERS

(75) Inventor: Klaus Brandstätter, Rosstal (DE)

(73) Assignee: HOB GmbH & Co. KG, Cadolzburg (DE)

( * ) Notice: Subject to any disclaimer, the term of this patent is extended or adjusted under 35 U.S.C. 154(b) by 525 days.

(21) Appl. No.: 11/541,800

(22) Filed: Oct. 3, 2006

(65) Prior Publication Data

US 2008/0082666 A1 Apr. 3, 2008

(51) Int. Cl.
*G06F 15/173* (2006.01)
(52) U.S. Cl. ................................ 709/226; 709/223
(58) Field of Classification Search ............... 709/223, 709/226
See application file for complete search history.

(56) References Cited

U.S. PATENT DOCUMENTS 6,950,849 B1 *  9/2005  Brandstatter ................ 709/203
7,287,082 B1 * 10/2007  O'Toole, Jr. ................ 709/228
2004/0199815 A1 * 10/2004  Dinker et al. ................ 714/21
2005/0108709 A1    5/2005  Sciandra et al.
2005/0160251 A1 *  7/2005  Zur et al. ..................... 712/1
2006/0184349 A1 *  8/2006  Goud et al. .................. 703/24
2007/0130342 A1 *  6/2007  Ishida et al. ................ 709/226

FOREIGN PATENT DOCUMENTS

WO    2006063276 A1    6/2006

OTHER PUBLICATIONS

Lothar Wendroth "Terminalserverfarm fur die averwaltung" vol. 28 Feb. 2006 pp. 49-51.

* cited by examiner

*Primary Examiner*—Nathan Flynn
*Assistant Examiner*—Jeong S Park
(74) *Attorney, Agent, or Firm*—Browdy and Neimark, PLLC

(57) ABSTRACT

A user-host-computer system includes at least two user computers, at least one host computer connectable to each of said user computers by a data network, each of said host computers running a virtualization program for virtualizing a plurality of single-user-guest-operating-systems as blade-type servers, a load balance relay unit implemented on each host computer, and a blade balancer application running on each virtualized blade-type server to connect to the load balance relay unit and reporting the current status data of the blade-type server to the load balance relay unit.

11 Claims, 1 Drawing Sheet

USER-HOST-COMPUTER SYSTEM WITH AUTOMATIC ALLOCATION OF USER-SESSIONS TO VIRTUALIZED BLADE-TYPE-SERVERS

BACKGROUND OF THE INVENTION

1. Field of the Invention

The present invention relates to a user-host-computer system comprising at least two user computers or so-called clients and at least one host computer connectable to each of said user computers by a data network like an Intranet or the Internet. Each of said host computers runs a virtualization program for virtualizing a plurality of operating systems, the so-called guests.

2. Background Art

In the prior art the aforesaid basic computer system structure is known in which multiple users are able to log-on to each guest which such is a multi-user-operating-system. Moreover, single-user-operating-systems are state of the art in which under one operating system only one user or client at a time is supported.

Running multiple single-user-operating-systems on host-computers in the computer-center and connecting clients running certain types of terminal emulations has several advantages:
  less administration complexity as all data and applications are hosted in the data center
  applications do not need to fulfill certain requirements which are the fact on multi-user-operating-systems (terminal servers)
  data and applications are totally independent for each user compared to terminal servers where only one common operating-system is running
  cost savings because there is no need to have hardware and software resources for each single user as normally not all users access the computer-center at the same time.

In user-host-computer systems in which several guest operating systems are participating there is the general problem to assign an user to a specific currently unused guest and to avoid an unbalanced load of the host computers to enhance the efficiency of the system.

SUMMARY OF THE INVENTION

Accordingly it is an object of the invention to provide for a user-host-computer system based on a plurality of virtualized single-user-guest-operating-systems on each host computer which ensures a optimal allocation of users to the host-systems with optimal balancing of the load of each host computer. The mentioned single-user-guest-operating-systems are so-called blade-type servers which support only one single user at a time. Therefore it is important to allocate new clients to currently unused blade-type servers or if necessary to a specific predefined blade. If the connection between a user and a guest is temporarily lost for any reason and the user starts to reconnect, it is required that the user is allocated to the same blade-type server as before. Moreover, also installations of multi-user-operating-systems which because of technical reasons or organizing configurations connect to only one user are covered by the invention.

Aforesaid object is met by a user-host-computer system comprising
  at least two user computers,
  at least one host computer connectable from each of said user computers by a data network, each of said host computers running a virtualization program for virtualizing a plurality of single-user-guest-operating-systems as blade-type servers, at each connection request by one of the user computers, a blade-type server is selected for this connection in one of the remote host computers automatically.

According to a preferred embodiment of the invention the user-host-computer system further comprises
  a load balance relay unit implemented on each host computer and,
  a blade balancer application running on each virtualized blade-type server to connect to the load balance relay unit and reporting the current status data of the blade-type server to the load balance relay unit, wherein each load balance relay unit is delivering host computer load relevant information and the reported current status data information of the blade-type servers to one of said user computers which is seeking a log in or reconnect to one of the blade-type servers and wherein said user computer is connecting or reconnecting to one of said blade-type servers based on at least one of the host computer load relevant information and the reported current status data of the blade-type servers.

Due to aforesaid structure of the user-host-computer system the transportation of the session data, i.e. the image display data, sound data and other output data of the server to the user computer and the input from the user by way of the keyboard, mouse events, sound or the like normally under RDP are totally independent of the blade balancing which is used to select one of the blade-type servers in one of the host computers to run an application of a user. By way of this independence there is no extra load on the computers which would be required if the session data would traverse the components used for the blade balancing. It is also possible to stop the components for this blade balancing during normal work. Such interruption which is sometimes required for any kind of maintenance, does prevent users to log-on or sign-on, but existing sessions do still work. This means that users are not affected in any kind through the interruption of the blade balancing process.

Preferred embodiments of the invention, specific characteristics and further advantages will become apparent from the following description, in which the invention is explained in greater detail based on the appended drawing.

DESCRIPTION OF THE PREFERRED EMBODIMENTS

Figure 1:
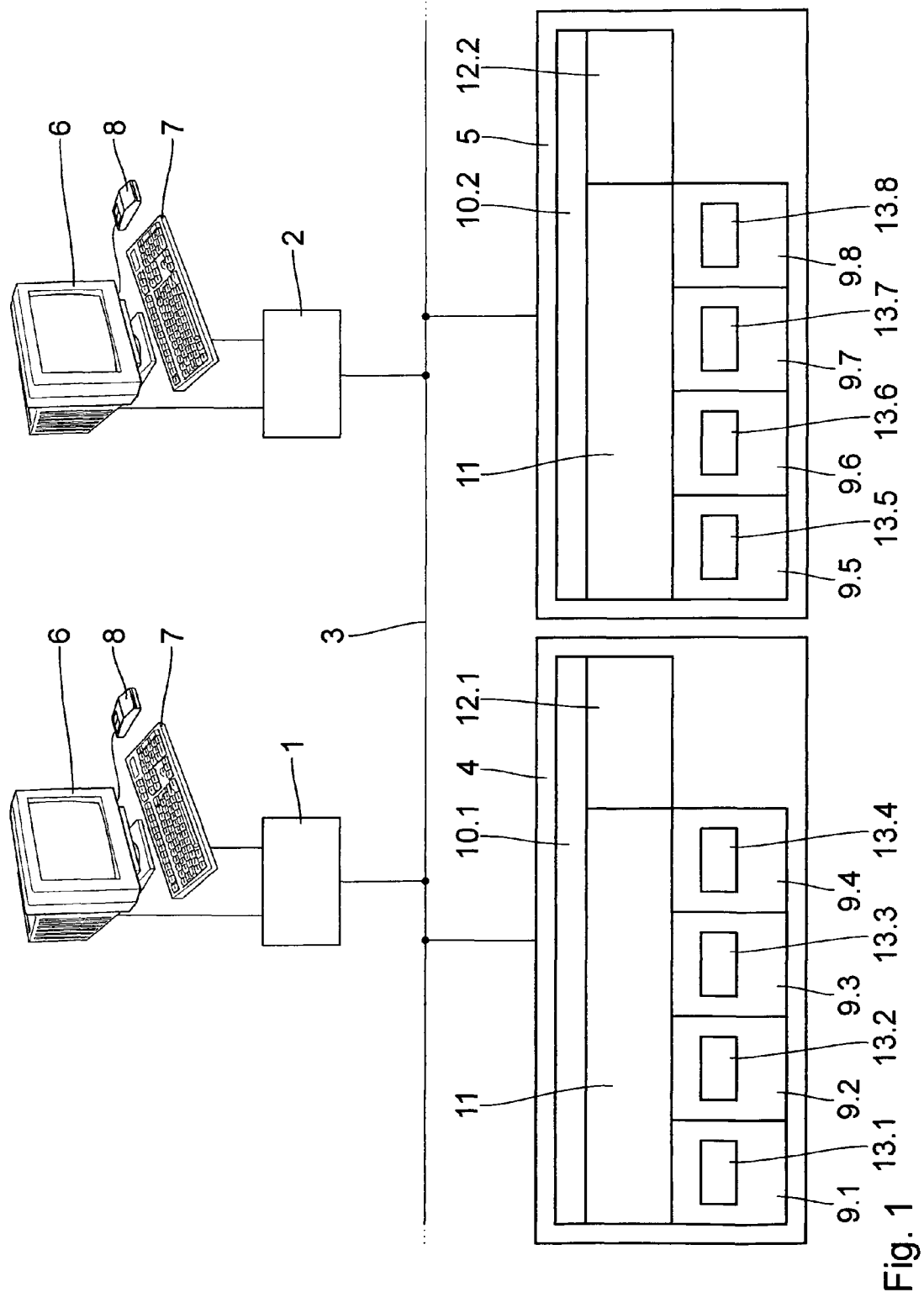
FIG. 1 is a schematic diagram of a user-host-computer system comprising two user computers and two remote host computers.

The accompanying drawing shows a user-host-computer system comprising two user computers 1, 2 which are also indicated as clients. These user computers are connectable via a network 3 like an Intranet or the Internet to one of the remote host computers 4, 5. The according network connections use protocols like X11, RDP or ICA. These protocols are designed so that on the local user computer 1, 2 the image is displayed on the screen 6 and any sound produced by an application or any other output of the application running on one of the host computers 4, 5 is played real time on the user computers 1, 2. Any input from the user via one of the keyboards 7 or the mouse 8 or sound input are sent via the network 3 to one of the host computers 4, 5 and processed there. The application of a specific user is running remotely on one of the host computers 4, 5.

The present invention is applicable for cases in which the host computers 4, 5 virtualize a plurality of single-user-guest-operating-systems as so-called blade-type servers 9.1-9.8. Virtualization means that the host computer 4, 5 with its host operating system 10 (e.g. Linux) runs a virtualization program, like IBM VM, VMware, Microsoft Virtual PC, XEN, QEMO, Bochs or any other software to virtualize a computer with one or multiple CPUs including the operating system. In this invention there is typically at least one of these host computers running a virtualization program 11 to establish the virtualized blade-type servers 9.1-9.8.

Basically each blade-type server 9.1-9.8 runs an application of one single user, i.e. the work of the users is respectively done in an application running under a single-user-guest-operating-system represented by the blade-type server 9.1-9.8. The user connects to the respective blade-type server 9.1-9.8 either directly or through the host computer 4, 5.

Now to ensure a balanced load of all host computers 4, 5 the invention provides for several useful means which are first of all a load balance relay unit 12.1, 12.2 running as an application under the operating system 10.1, 10.2 of each host computer 4, 5. The load balance relay unit can connect to a blade balancer application 13.1-13.8 running on each virtualized guest, i.e. the blade-type servers 9.1-9.8. The connection is established by network protocols like IP, TCP, UDP, special APIs of the virtualization program 11 or in any other way. Over this connection each blade balance application 13.1-13.8 (called blade balancer in the following) report the current status of each blade-type server 9.1-9.8 to each load balance relay unit 12.1, 12.2. This is normally done when the connection is established and also each time there are changes in the current status of the blade-type servers 9.1-9.8.

The status data reported by each blade balancer 13.1-13.8 represent one of the status types "IDLE" (meaning there is no user computer 1, 2 connected to the respective blade-type server 9.1-9.8), "CONNECTED" (meaning active, i.e. a user computer 1, 2 is currently connected to this blade-type server 9.1-9.8 and running its applications there), "DISCONNECTED" (meaning that the network connection between the user computer 1, 2 and the respective blade-type server 9.1-9.8 has been interrupted and the blade-type server 9.1-9.8 waits for a reconnect of the same user computer 1, 2) and "SIGN-ON" (meaning a user computer 1, 2 is currently entering its credentials to log-on to a certain blade-type server 9.1-9.8—in this situation the blade-type server 9.1-9.8 is in use but it is not yet known which user computer 1, 2 is doing the log-on).

Beyond above mentioned information data the blade balancer of each blade-type server 9.1-9.8 sends further information including the network address of the respective blade-type server 9.1-9.8, the name of the user computer 1, 2 that is logged-on, the computer name of the blade-type server 9.1-9.8 and other useful information. The load balancing relay unit 12.1, 12.2 keeps all this information in a list or table for later retrieval.

When a user e.g. via user computer 1 wants to connect to any of the so-called guests represented by the blade-type servers 9.1-9.8 or when it wants to do a possible reconnect after an interruption of the network communication it sends a load balancing query to all load balancing relay units 12.1, 12.2 running on all host computers 4, 5 of the user-host-computer system. This load balancing query includes the user ID of the querying user computer 1.

The load balancing query mentioned above typically is sent over a connectionless transport protocol like UDP, since this means less overhead than a connection oriented protocol. Broadcasts may be used, which means no configuration of network addresses of the blade-type servers 9.1-9.8 or load balancing relays 12.1, 12.2 is needed on the user computers 1, 2. Alternatively the user computers 1, 2 may have configured a list of all load balancing relays 12.1, 12.2 in a server list. When the user searches for a blade-type server, it sends (UDP) unicast packets to all load balancing relays 12.1, 12.2 defined in its server list.

Due to the load balancing query all load balancing relay units 12.1, 12.2 check on the one hand the associated host computer 4, 5 as concerns the load on its host operating system 10.1, 10.2. The load can be defined as CPU usage, memory usage, used network bandwidth, disc utilization or any other helpful parameters.

Each load balancing relay unit 12.1, 12.2 further checks the reported current status data of each blade-type server 9.1-9.8 of the host computers 4, 5 by searching in its tables in which said information is listed. Thus the load balancing relay units 12.1, 12.2 each check which blade-type servers 9.1-9.8 are in the state "IDLE" or "DISCONNECTED", i.e. a reconnect can principally be done. In this case the load balance relay units 12.1, 12.2 check if the user ID in the load balancing query matches the user ID of the guest with the state "DISCONNECTED".

In case a match between the user ID of the querying using computer 1 and the user ID of e.g. blade-type server 9.1 in the status type "DISCONNECTED" is found, the according load balancing relay unit 12.1 resends a load balance reply to the querying user computer 1 including information about the status type "DISCONNECTED", the network address of the blade-type server 9.1 and the load on the associated host computer 4. Thus the querying user computer 1 can reconnect to its application running e.g. on blade-type server 9.1.

In case no match between the user ID of another querying user computer 2 and the user ID of e.g. blade-type servers 9.4-9.8 in the status type "DISCONNECTED" is found, the load balance relay unit 12.2 randomly selects one of the blade-type servers 9.5-9.8 with the status type "IDLE" and resends a load balancing reply to the querying user computer 2 including information about the network address of the blade-type servers 9.5-9.8 with the status type "IDLE" and about the load on the associated host computer 5.

Thus the querying user computers 1, 2 based on the load balance replies of all load balance relay units 12.1, 12.2 then select one 9.1 of the blade-type servers 9.1-9.8 to reconnect thereto or to connect to e.g. blade-type server 9.5 of a host computer 5 with the least reported load. In this way when normal connect is done, the host systems of the host computers 4, 5 are used in an optimum and highly efficient way by a load balancing between the host computers 4, 5.

To avoid any inadmissible connections to a busy blade-type server 9.1-9.8 which is in the state of connection to one user computer 1, 2 the load balancing relay units 12.1, 12.2 after publishing the network address of a connectable blade-type server 9.1-9.8 locks this specific entry of the blade-type servers 9.1-9.8 in its table for a predetermined time. Thus access to a specific blade-type server 9.1-9.8 by user computers differing from the querying user computer 1, 2 is avoided.

In an alternative configuration the load balancing relay units 12.1, 12.2 can be used to provide for a defined association between one of the blade-type servers 9.1-9.8 and a certain user computer 1, 2. In other words this means that by way of configuration each guest is destined for a certain user and only this user is authorized to log-on to the associated guest. A load balance relay unit 12.1, 12.2 can therefore selectively start a specific one of the blade-type servers 9.1-

9.8 when one of the user computers 1, 2 being configured for one of said specific blade-type server 9.1-9.8 sends a query to connect. Under the virtualization program 11 the blade-type servers 9.1-9.8 configured for special user computers 1, 2 can be started but remaining in the state "IDLE" as long as the associated user computer 1, 2 does not wish to log on, but they can also be shut down or suspended. The load balancing relay unit 12.1, 12.2 may also start the specific one of blade-type servers 9.1-9.8 for a certain user computer 1, 2 or it can do a resume.

The user-host-computer system as depicted in the accompanying drawing may also use a well-known functionality which is the so-called "Seamless Windows" or "True Windows" (always denominated as "Seamless Windows" in the following). In such an installation a client does not see the entire desktop on the user computer 1, 2, but by way of some specific information sent over the network between the host computer 4, 5 and the connected user computer 1, 2 only the windows running on the server are displayed. For this sake information about the window size and position is sent from the specific blade-type server 9.1-9.8 to the involved user computer 1, 2. In most cases still the information of the entire desktop window, the complete pixel set, is sent, but on the user computer only the windows are displayed, whereas applications running on the user computer are shown in other areas of the monitor. Alternatively, around the displayed windows of the application running on the blade-type server 9.1-9.8 the user computer 1, 2 can just show the desktop background. Thus the fact that an application of a client is not running on the user computer 1, 2 but remotely on one of the blade-type servers 9.1-9.8 is completely hidden. Thus the operator is protected from mixing up display buttons associated to different applications running on the associated blade-type server and the user computer.

Seamless Windows is known for terminal-servers, but not yet for single-user operating systems. To use this technique for single-user operating systems, extra functionality is needed, since it is still required that an operator or person doing maintenance has to get a session where Seamless Windows is not active. If an operator would get Seamless Windows, he could only use predefined applications. But for maintenance, all applications have to be used; also applications which are normally hidden or blocked for the normal user. To reach this functionality, a session from the client (typically RDP) first connect to a server-component and notifies this server-component that it can do Seamless Windows. When later the real desktop session is started, it is started in the regular way, the additional components for "Seamless Windows" are not started, instead of the normal functions of the single-user operating system for user-interventing are started.

What is claimed is:

1. A user-host-computer system comprising
at least two user computers,
at least one host computer connectable from each of said user computers by a data network, each of said host computers running a virtualization program for virtualizing a plurality of single-user-guest-operating-systems as virtualized blade-type servers,
at each connection request by one of the user computers, a blade-type server is selected for this connection in one of the host computers automatically by
a load balance relay unit implemented on each host computer and,
a blade balancer application running on each virtualized blade-type server to connect to the load balance relay unit and reporting the current connection status data of the virtualized blade-type server to the load balance relay unit,
wherein each load balance relay unit delivers host computer load relevant information and the reported current status data information of the virtualized blade-type servers to one of said user computers which is seeking a log in or reconnect to one of the currently unused virtualized blade-type servers and
wherein said user computer connects or reconnects to one of the virtualized blade-type servers based on at least one of the host computer load relevant information and the reported current connection status data of the virtualized blade-type servers;
wherein the reported current status data reported by each blade balancer application represent one of the status types "IDLE", "CONNECTED", "DISCONNECTED" and "SIGN-ON",
wherein
"IDLE" status means that there is no user computer connected to the respective blade-type server;
"CONNECTED" status means that one of the at least one user computer is currently connected to the blade-type server and running its applications there;
"DISCONNECTED" status means that the network connection between the user computer and the respective blade-type server has been interrupted and the blade-type server waits for a reconnection of the same user computer; and
"SIGN-ON" status means that one of the at least one user computer is currently entering its credentials to log-on to a certain blade-type server, such that the blade-type server is in use and does not yet know which user computer is doing the log-on.

2. The user-host-computer system according to claim 1, wherein the blade balance application of each of the virtual blade-type servers sends further information including at least one of a network address of said virtual blade-type server, the name of a user computer connected to said virtual blade-type server and a computer name of the virtual blade-type server.

3. The user-host-computer system according to claim 1, wherein for connection or reconnection to one of said virtual blade-type servers one of said user computers is sending a load balancing query including its user-id to all load balance relay units of the host computers, which load balance relay units list the load of the associated host computer and of the reported current status data of the virtual blade-type servers of said host computer including checking a possible match between the user-id of the querying user computer and a user-id of a virtual blade-type server with the status type "DISCONNECTED".

4. The user-host-computer system according to claim 3, wherein the load balancing query is one of a broadcast type query and a unicast type query.

5. The user-host-computer system according to claim 4, wherein in case a unicast type query is sent a predefined serverlist is available on the user computer containing network addresses of all load balance relay units to which load balancing queries are to be sent.

6. The user-host-computer system according to claim 3, wherein in case a match between the user-id of the querying user computer and the user-id of a virtual blade-type server in the status type "DISCONNECTED" is found the load balance relay resends a load balance reply to the querying user computer including information about the status type "DISCONNECTED", the network address of the virtual blade-type server and the load on the associated host computer for initiating a reconnect of the user computer.

7. The user-host-computer system according to claim 3, wherein in case no match between the user-id of the querying user computer and the user-id of a virtual blade-type server in the status type "DISCONNECTED" is found the load balance relay unit randomly selects one of the virtual blade-type servers with the status type "IDLE" and resends a load balance reply to the querying user computer including information at least about the network address of the virtual blade-type servers with the status type "IDLE" and about the load on the associated host computer.

8. The user-host-computer system according to one of claim 6 or 7, wherein the querying user computer based on the load balance replies of all load balance relay units then selects one of the virtual blade-type server to reconnect thereto or to connect to a virtualized blade-type server of a host computer with the least reported load.

9. The user-host-computer system according to one of claim 6 or 7, wherein the load balance relay units, when resending a load balance reply, lock the reported user-ids of the virtual blade-type servers for a predetermined time to avoid access to said virtual blade-type servers by user computers different from the querying user computer.

10. The user-host-computer system according to claim 1, wherein at least one of said virtual blade-type servers is configured for one selected user computer the associated load balance relay unit selectively is starting said at least one virtual blade-type server exclusively for the selected user computer.

11. The user-host-computer system according to claim 1, wherein a seamless window functionality is implemented on the virtual blade-type servers forming said single-user-guest operating-system.

* * * * *